United States Patent
Rogers et al.

(10) Patent No.: US 6,704,021 B1
(45) Date of Patent: Mar. 9, 2004

(54) METHOD AND APPARATUS FOR EFFICIENTLY PROCESSING VERTEX INFORMATION IN A VIDEO GRAPHICS SYSTEM

(75) Inventors: Philip J. Rogers, Pepperell, MA (US); Matthew P. Radecki, Oviedo, FL (US)

(73) Assignee: ATI International SRL, Christchurch (BB)

( * ) Notice: Subject to any disclaimer, the term of this patent is extended or adjusted under 35 U.S.C. 154(b) by 443 days.

(21) Appl. No.: 09/716,735

(22) Filed: Nov. 20, 2000

(51) Int. Cl.[7] .............................................. G06F 12/02
(52) U.S. Cl. ..................... 345/543; 345/503; 345/522; 345/541; 345/537; 709/323
(58) Field of Search ................................ 345/419, 581, 345/503, 520, 522, 531, 536, 537, 542, 543; 709/312, 321, 323

(56) References Cited

U.S. PATENT DOCUMENTS

| | | | | |
|---|---|---|---|---|
| 5,440,746 A | * | 8/1995 | Lentz | 345/504 |
| 5,757,386 A | * | 5/1998 | Celi et al. | 345/548 |
| 5,812,136 A | * | 9/1998 | Keondjian | 345/419 |
| 6,184,908 B1 | * | 2/2001 | Chan et al. | 345/522 |
| 6,286,092 B1 | * | 9/2001 | Frank et al. | 711/207 |
| 6,362,826 B1 | * | 3/2002 | Doyle et al. | 345/532 |
| 6,369,813 B2 | * | 4/2002 | Pentkovski et al. | 345/419 |
| 6,426,747 B1 | * | 7/2002 | Hoppe et al. | 345/419 |
| 6,437,779 B1 | * | 8/2002 | Saito et al. | 345/420 |

\* cited by examiner

Primary Examiner—Ulka J. Chauhan
(74) Attorney, Agent, or Firm—Vedder, Price, Kaufman & Kammholz, P.C.

(57) ABSTRACT

A video graphics system (300) employs a method and apparatus for efficiently processing vertex information required to render graphics primitives requested for display by an application (313), such as a video game. The video graphics system includes a graphics driver (317), a graphics processor (305), a memory component (309, 321) that is accessible by the graphics processor, and a memory component (319) that is inaccessible by the graphics processor. After receiving, from the application, a drawing command that includes vertex indices and a reference to a vertex buffer (325) stored in the graphics processor-inaccessible memory component, the graphics driver allocates a new temporary vertex buffer (327) in the graphics processor-accessible memory component and copies the contents of the graphics processor-inaccessible vertex buffer into the temporary vertex buffer. The graphics driver then generates a new drawing command including the vertex indices and a reference to the temporary vertex buffer, and provides the new drawing command to the graphics processor to enable the graphics processor to retrieve and process the vertex information contained in the temporary vertex buffer. After vertex information processing has been completed, the graphics processor preferably notifies the graphics driver to facilitate de-allocation of the temporary vertex buffer. In a preferred embodiment, the graphics driver is implemented in software and stored on a computer-readable storage medium (318).

18 Claims, 5 Drawing Sheets

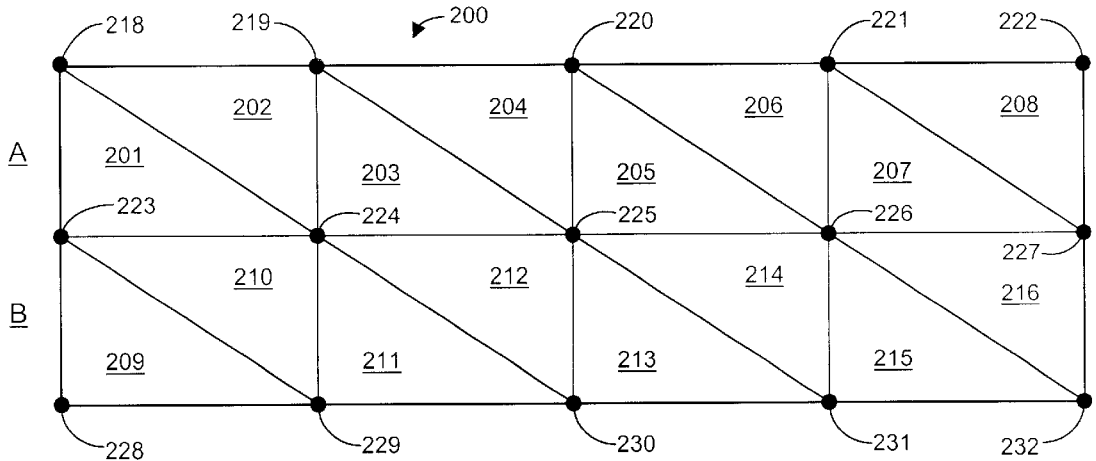

GRAPHICS DRIVER COMMAND ALTERNATIVES:

1) PRIMITIVE LIST: (223, 218, 224), (218, 219, 224), (224, 219, 225), . . .
   - REQUIRES VERTEX INFORMATION FOR 48 VERTICES

2) PRIMITIVE STRIPS:
   STRIP A: 223, 218, 224, 219, 225, 220, 226, 221, 227, 222
   STRIP B: 228, 223, 229, 224, 230, 225, 231, 226, 232, 227
   - REQUIRES VERTEX INFORMATION FOR 20 VERTICES

3) INDEXED PRIMITIVE LIST: $(I_{223}, I_{218}, I_{224}), (I_{218}, I_{219}, I_{224}), \ldots$;
   WHERE $I_N$ IS INDEX TO VERTEX INFORMATION STORED IN VERTEX BUFFER
   - REQUIRES 48 INDICES 4) INDEXED PRIMITIVE STRIPS:
   STRIP A: $I_{223}, I_{218}, I_{224}, I_{219}, I_{225}, I_{220}, I_{226}, I_{221}, I_{227}, I_{222}$
   STRIP B: $I_{228}, I_{223}, I_{229}, I_{224}, I_{230}, I_{225}, I_{231}, I_{226}, I_{232}, I_{227}$;
   WHERE $I_N$ IS INDEX TO VERTEX INFORMATION STORED IN VERTEX BUFFER
   - REQUIRES ONLY 20 INDICES

FIG. 2
--PRIOR ART--

METHOD AND APPARATUS FOR EFFICIENTLY PROCESSING VERTEX INFORMATION IN A VIDEO GRAPHICS SYSTEM

FIELD OF THE INVENTION

The invention relates generally to vertex information processing in video graphics systems. More particularly, the present invention relates to a method and apparatus for efficiently processing vertex information in a video graphics system, especially when such vertex information is stored by an application in a memory location that is inaccessible by the system's graphics processing engine.

BACKGROUND OF THE INVENTION

Video graphics systems are commonly used to display two-dimensional (2D) and three-dimensional (3D) objects on display devices, such as computer monitors and television screens. Such systems receive drawing commands and object configuration information from software applications, such as video games or Internet browser applications, process the commands based on the object configuration information, and provide appropriate signals to the display devices to illuminate pixels on the device screens, thereby displaying the objects. A block diagram for a typical video graphics system 100 is depicted in FIG. 1. The video graphics system 100 includes, inter alia, a host processing unit 101, a peripheral component interconnect (PCI) bus 103, a graphics processor 105, memory 107, 109 and a display device 111. The graphics processor 105 is typically located on a video card 113 together with local memory 109 that is accessed and used regularly by the graphics processor 105.

The PCI bus 103 typically includes appropriate hardware to couple the host processing unit 101 to the system memory 107 and the graphics processor 105, and to couple the graphics processor 105 to the system memory 107. For example, depending on the system configuration, the PCI bus 103 may include a memory and bus controller integrated circuit (IC) and an accelerated graphics port (AGP) bus to facilitate direct memory access (DMA) transfers of data stored in a graphics processor-accessible component 123 of the system memory 107 to the graphics processor 105. The display device 111 is typically a conventional cathode ray tube (CRT) display, liquid crystal display (LCD), or other display. Although not shown for purposes of clarity, other components, such as a video frame buffer, a video signal generator, and other known 3D pipeline components, are commonly incorporated between the graphics processor 105 and the display device 111 to properly display objects rendered by the graphics processor 105.

The host processing unit 101 is typically a central processing unit (CPU) or an equivalent microprocessor-based computer. The host processing unit 101 generally executes several software applications with respect to video graphics processing, including a host application 115, a runtime layer 117, and a graphics driver application 119. These applications 115–119 are typically stored on the hard disk component of the system memory 107, a memory card, a floppy disk, a CD-ROM, or some other computer-readable storage medium. The host application 115 is the application that initiates all drawing commands and provides all information necessary for the other graphics applications and processing components to display objects on the display device 111. For example, the host application 115 might be a word processing application, a video game, a computer game, a spreadsheet application, or any other application that requires two-dimensional or three-dimensional objects to be displayed on a display device 111.

In graphics systems, each object to be displayed is typically divided into one or more graphics primitives. Common primitives include a point, a line, and a triangle. Each primitive includes a respective number of vertices. For example, a point primitive has one vertex, a line primitive has two vertices, and a triangle primitive has three vertices. Each vertex has information associated with it to indicate, inter alia, its position in a reference coordinate system and its color. In most applications, such vertex information consists of a vector of multiple parameters to indicate the vertex's position and other optional properties. For example, the vector may include parameters relating to the vertex's normal, diffuse color, specular color, other color data, texture coordinates, and fog data. Consequently, the host application 115 not only issues drawing commands, but also provides the vertex information for each vertex of each primitive to be drawn to display each object of a graphics scene.

The runtime layer 117 provides a well-defined application programming interface (API) to the host application 115 and a well-defined device driver interface (DDI) to the graphics driver application 119. That is, the runtime layer 117 is a software layer that enables various host applications 115 to interface smoothly with various graphics driver applications 119. One example of a runtime layer application 117 is the "DIRECTX7" application that is commercially available from Microsoft Corporation of Redmond, Wash.

The graphics driver application 119 is the application that provides drawing commands to the graphics processor 105 in a manner understandable by the graphics processor 105. In most circumstances, the graphics driver application 105 and the video card 113 containing the graphics processor 105 are sold as a set to insure proper operation of the graphics rendering portion of the system (i.e., the portion of the graphics system 100 that receives vertex information from the host application 115, processes the vertex information, and generates the appropriate analog signals to illuminate the pixels of the display device 111 as indicated in the vertex information).

During its execution, the host application 115 stores vertex information in either the system memory 107 or the local memory 109 on the video card 113. To store the vertex information, the host application 115 first requests allocation of portions of the respective memory 107, 109 and then stores the vertex information in the allocated portions. The allocated portions of memory 107, 109 are typically referred to as vertex buffers (VBs) 125. The system memory 107 is generally divided into several components 121, 123, some of which are accessible by the graphics processor 105 and others of which are inaccessible by the graphics processor 105. The inaccessible components 121 of system memory 107 typically include all cacheable and swappable components of system memory 107. The host application 115 selects where to allocate the vertex buffers 125 and store the vertex information. As described in more detail below with respect to FIG. 2, the host application's selection of where to store the vertex information can significantly impact the speed and efficiency of graphics processing.

After the host application 115 stores the vertex information in one or more vertex buffers 125, the host application 115 issues drawing commands to the graphics driver 119 via the runtime layer 117. Each drawing command typically includes an instruction (e.g., "draw"), a memory identification (system memory 107 or video card local memory 109), an address in the identified memory 107, 109 of a vertex buffer 125, and a quantity of vertices in the vertex buffer 125. Upon receiving the commands, the graphics driver 119 processes and reformats the commands into a form executable by the graphics processor 105, and stores the processed/reformatted commands in allocated areas of system memory 107 or video card local memory 109 that are accessible by the graphics processor 105. Such areas of memory 107, 109 are typically referred to as command buffers (CBs) 127. After filling a particular command buffer 127 with a group of drawing commands, the graphics driver 119 dispatches the command buffer 127 by sending a signal to the graphics processor 105 instructing the processor 105 to fetch and process the commands in the command buffer 127. Typically, the graphics driver 119 is filling command buffers 127 faster than the graphics processor 105 can process the commands. Consequently, queuing algorithms are typically employed between the graphics driver 119 and the graphics processor 105 to allow the graphics processor 105 to quickly begin processing a new command buffer 127 upon completion of processing a prior buffer 127. The graphics processor 105 typically processes the command buffers 127 in the order in which they are dispatched by the graphics driver 119.

The types of commands issued by the host application 115 and the locations of the vertex buffers 125 for the commands substantially impact the speed at which the commands can be processed by the graphics rendering portion of the system 100. The commands promulgated by the host application 115 may be in various forms depending on the individual selection of the host application developer. Common types of commands include primitive lists, primitive strips, indexed primitive lists, and indexed primitive strips. The primitive list and primitive strip commands are less processing efficient, but may be used in virtually any video graphics system; whereas, the indexed primitive list and indexed primitive strip commands are more processing efficient, provided that the graphics rendering portion of the system 100 has DMA transfer capability. These commands and the processing speed effects of these commands with respect to vertex buffer location can be more readily understood with reference to FIG. 2.

FIG. 2 illustrates an exemplary two-dimensional object 200 to be rendered for display by the video graphics system 100. As shown, the exemplary object (e.g., rectangle 200) is divided into multiple graphics primitives (e.g., triangle primitives 201–216) and each primitive 201–216 includes multiple vertices 218–232. As described above, each vertex 218–232 has respective vertex information (e.g., position and color information) associated with it. The vertex information for each vertex 218–232 can range from eight bytes to eighty bytes or more in length depending on which vertex properties are specified for the vertices by the host application 115.

A primitive list command contains a list of vertices for each primitive 201–206 to be rendered. Receipt of a primitive list command from the host application 115 requires the graphics driver 119 to create and store a command in the command buffer 127 that includes the vertex information for each vertex 218–232 of each primitive 201–216 with no vertex information reuse. Thus, the primitive list command requires the graphics driver 119 to copy the vertex information for each vertex 218–232 in the list from the vertex buffer 125 into the command buffer 127. For the object 200 depicted in FIG. 2, a primitive list command would include forty-eight (48) vertices, three for each triangle primitive 201–216. Accordingly, the graphics driver 119 must copy the vertex information for all forty-eight vertices 218–232 into the command buffer 127 and the graphics processor 105 must then read the vertex information for all forty-eight vertices 218–232 from the command buffer 127. If the vertex information for each vertex 218–232 is twenty bytes long, the primitive list command requires transmission of at least 960 bytes of information to the graphics processor 105 in order for the graphics processor 105 to render the object 200. The primitive list command is the least processing efficient command.

The primitive strip command is more processing efficient because it incorporates some vertex information reuse. With respect to the exemplary object 200 of FIG. 2, each primitive strip command received from the host application 115 would include only ten vertices for its respective strip (e.g., ten vertices 218–227 for strip A and ten vertices 223–232 for strip B), where each strip contains the triangle primitives required to render one-half of the rectangular object 200. The primitive strip command is organized such that, when using triangle primitives, any three sequential vertices constitute a triangle primitive. Therefore, by using two primitive strip commands to instruct the graphics driver 119 to render the object 200, the graphics driver 119 need only copy the vertex information for twenty vertices from the vertex buffer 125 into the command buffer 127 in order to instruct the graphics processor 119 to render the object 200. The graphics processor 105 Would then read the vertex information for the twenty vertices from the command buffer 127 in order to process the commands. If, as discussed above, the vertex information for each vertex 218–232 is twenty bytes long, each primitive strip command requires transmission of 200 bytes of information to the graphics processor 105. Therefore, although the use of two primitive strip commands is more efficient than using a single primitive list command (400 bytes of information versus 960 bytes of information), both primitive list and primitive strip commands are inefficient because they require redundant transmission of at least some vertex information.

The indexed primitive list command is more processing efficient than the primitive list and primitive strip commands because it does not require redundant transmission of vertex information to the graphics processor 105. In this command, the host application 115 provides a list of indices ($I_N$) corresponding to the vertices in a vertex buffer 125, an address of the vertex buffer 125 in a particular memory 107, 109, and the number of vertices for which vertex information is stored in the vertex buffer 125. The graphics driver 119 passes these indices, the quantity of vertices, and the vertex buffer address along to the graphics processor 105. The graphics processor 105 then reads the vertex information for each indexed vertex directly from the vertex buffer 125 in order to process the command and render the object 200. If each index is two bytes long, the command generated by the graphics driver 119 to instruct tile graphics processor 105 to render the object 200 depicted in FIG. 2 includes 96 bytes of index information (two bytes for each of forty-eight indices corresponding to the forty-eight vertices of the sixteen primitives 201–216 of the object 200). Accordingly, the graphics processor 105 must retrieve and process approximately 396 bytes of information (96 bytes from the command buffer 127 and 300 bytes from the vertex buffer) to render the object 200 when an indexed primitive list command is used, in contrast to 960 bytes or 400 bytes of information when a primitive list command or a primitive strip command, respectively, is used. Therefore, the amount of time required for the graphics processor 105 to acquire and process an indexed primitive list command is generally less, and in some instances substantially less, than the amount of time required to acquire and process primitive list or primitive strip commands, thereby improving overall graphics processing speed and efficiency. However, since the indexed primitive list command requires the graphics processor 105 to be able to read the vertex information from the vertex buffer 125, indexed primitive list commands may only be used in graphics systems with DMA capability. If an indexed primitive list command is received by a graphics driver 119 in a video graphics system that does not have vertex DMA capability, the graphics driver 119 must convert the indexed primitive list command into a regular primitive list command before storing the command in a command buffer 127. Converting the indexed primitive list command into a regular primitive list command is considerably slower than processing the indexed primitive list command because the graphics driver 119 must de-reference all the indices in the indexed primitive list command and copy all the vertex information associated with the indexed vertices into the command buffer 127.

In an indexed primitive strip command, similar to the indexed primitive list command, the host application 115 provides the graphics driver 119 a list of indices ($I_N$) corresponding to the vertices in a vertex buffer 125, a quantity of vertices in the vertex buffer 125, and an address of the vertex buffer 125 in a particular memory 107, 109. However, in contrast to the indexed primitive list command, the host application 115 takes advantage of index reuse to reduce the number of indices that must be provided to render any particular object 200. Thus, to request display of the object 200 of FIG. 2, two indexed primitive strip commands would be used, each command including ten indices. If, as discussed above, each index is two bytes long, the commands generated by the graphics driver 119 to instruct the graphics processor 105 to render the object 200 depicted in FIG. 2 would include 40 bytes of index information (two bytes for each of the twenty indices corresponding to the twenty vertices of the sixteen primitives 201–216 of the object 200). Accordingly, the graphics processor 105 must retrieve and process approximately 340 bytes of information (40 bytes from the command buffer 127 and 300 bytes from the vertex buffer 125) to render the object 200 when indexed primitive strip commands are used, in contrast to 396 bytes, 400 bytes, or 960 bytes of information when an indexed primitive list command, primitive strip commands, or a primitive list command, respectively, are used. Therefore, for the rectangular object 200 of FIG. 2, two indexed primitive strip commands would be most processing efficient for a DMA-capable graphics system. However, it should be noted that the indexed primitive list command might be most processing efficient in certain circumstances when the object 200 to be rendered is not rectangular in shape.

Although the indexed primitive list and indexed primitive strip commands are preferred in DMA-capable graphics systems, locations of the vertex buffers 125 can detrimentally impact the benefits of using those commands. As noted above, the host application 115 selects the memory location for the vertex buffer 125. As also noted above, some components 121 of system memory 107 (e.g., cacheable and swappable components) are not accessible by the graphics processor 105. When the selected vertex buffer memory location is an area or component 121 of system memory 107 that is inaccessible by the graphics processor 105, the graphics driver 119 cannot simply, or with minimal processing, pass along the received indices and vertex buffer address. In such instances, prior art systems require the graphics driver 119 to convert the indexed command into a non-indexed primitive list command, thereby eliminating all the processing efficiency of using an indexed command in the first place. For example, in prior art systems, when the graphics driver 119 receives either an indexed primitive list command or an indexed primitive strip command from the host application 115 referencing a vertex buffer 125 located in a memory component 121 that is inaccessible by the graphics processor 105, the graphics driver 119 copies the vertex information for all the vertices from the vertex buffer 125 into the command buffer 127, thereby converting the original indexed primitive list or primitive strip command into a primitive list command and eliminating all the processing efficiency of using the indexed command.

One approach to resolving the above vertex buffer location problem is to require the host application 115 to store vertex information only in memory components 109, 123 that are accessible by the graphics processor 105. However, there are many host application developers and issuing such an edict may not be well received or followed by all developers. Moreover, even if all new host applications 115 did store their vertex information in graphics processor-accessible memory components 109, 123, many existing applications 115 do not do so, but still issue indexed commands. Thus, such a requirement would not improve processing performance of existing graphics systems.

Therefore, a need exists for a method and apparatus for efficiently processing vertex information in a video graphics system that facilitate use of indexed commands without loss of efficiency in the event that vertex information is stored by a host application in a memory location that is inaccessible by the system's graphics processor.

BRIEF DESCRIPTION OF THE DRAWINGS

FIG. 2 is a two-dimensional view of an exemplary object to be rendered for display by the video graphics system of FIG. 1, wherein the object is divided into multiple graphics primitives and each graphics primitive includes multiple vertices.

DETAILED DESCRIPTION OF A PREFERRED EMBODIMENT

Figure 1:
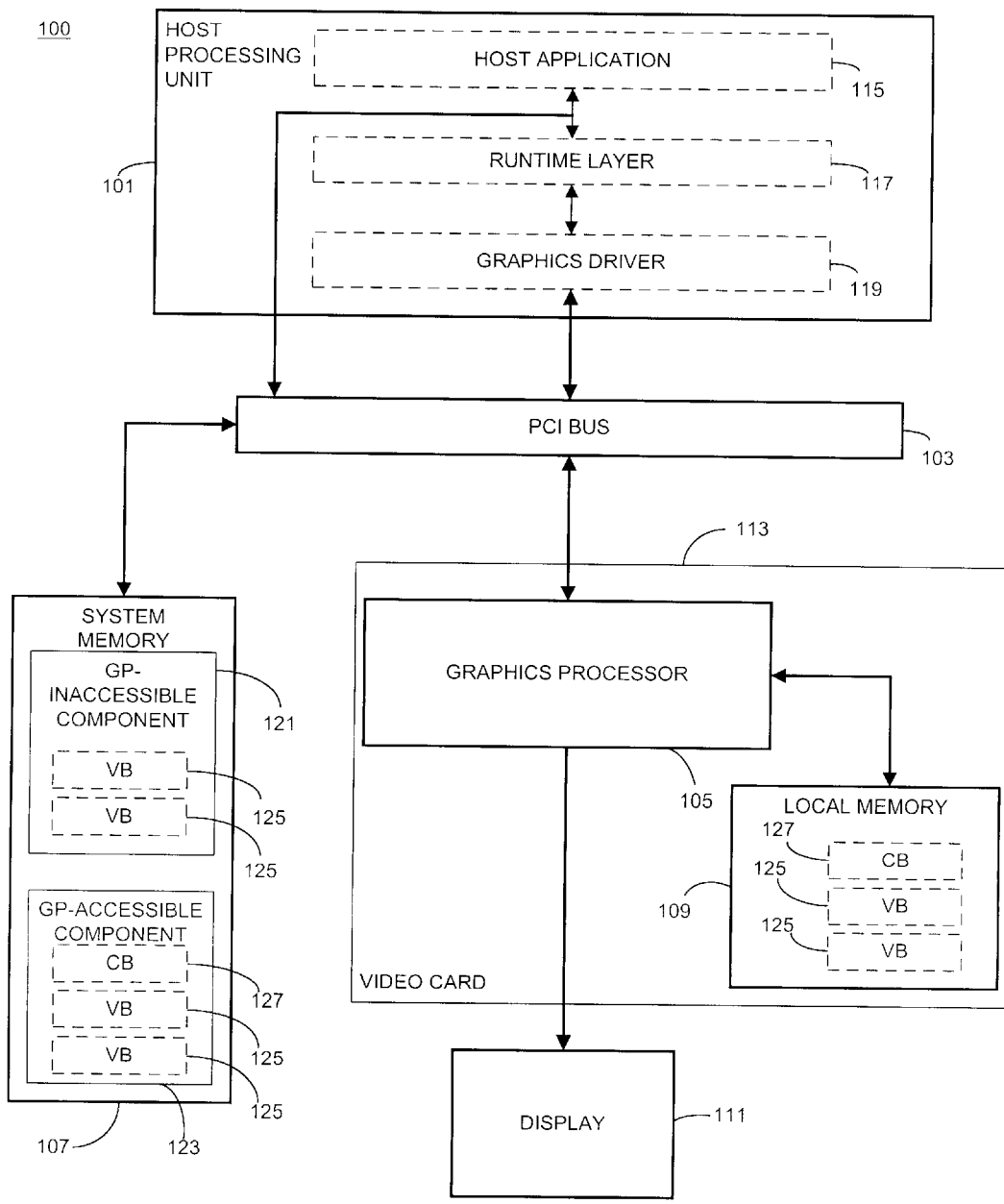
FIG. 1 is a block diagram of a conventional video graphics system that facilitates direct memory access transfers between system memory and a graphics processor.

Generally, the present invention encompasses a method and apparatus for efficiently processing vertex information in a video graphics system. The video graphics system includes a graphics driver, a graphics processor, a memory component that is accessible by the graphics processor, and a memory component that is inaccessible by the graphics processor. The graphics driver receives a drawing command from an application. The drawing command requests display of one or more single-vertexed or multiple-verticed graphics primitives on a display device operably coupled to the graphics processor. The drawing command includes indices corresponding to respective vertices of the primitives for which associated vertex information is stored in the graphics processor-inaccessible memory component. Responsive to receiving the drawing command, the graphics driver allocates a portion of the graphics processor-accessible memory component for storing the vertex information to produce a vertex buffer. The graphics driver then copies the vertex information from the graphics processor-inaccessible memory component into the vertex buffer and provides at least a second command to the graphics processor. The second command, which preferably constitutes one of multiple commands stored in a command buffer, includes the vertex indices and an address of the vertex buffer in the graphics-accessible memory component to enable the graphics processor to retrieve and process the vertex information.

By providing access to vertex information in this manner, the present invention facilitates efficient processing of indexed commands by generating a temporary vertex buffer in graphics processor-accessible memory in the event that the vertex information associated with the indexed command as originally issued by the application is stored by the application in a memory location that is inaccessible by the system's graphics processor. Through generation and use of such a temporary vertex buffer, the present invention reduces the amount of information required to be transferred to the graphics processor to execute an indexed command by maintaining the indexed nature of the command and instructing the graphics processor to read vertex information from the temporary vertex buffer, in sharp contrast to the prior art approach of converting the indexed command into a non-indexed primitive list command, thereby improving the overall speed and efficiency of the graphics system.

Figure 3:
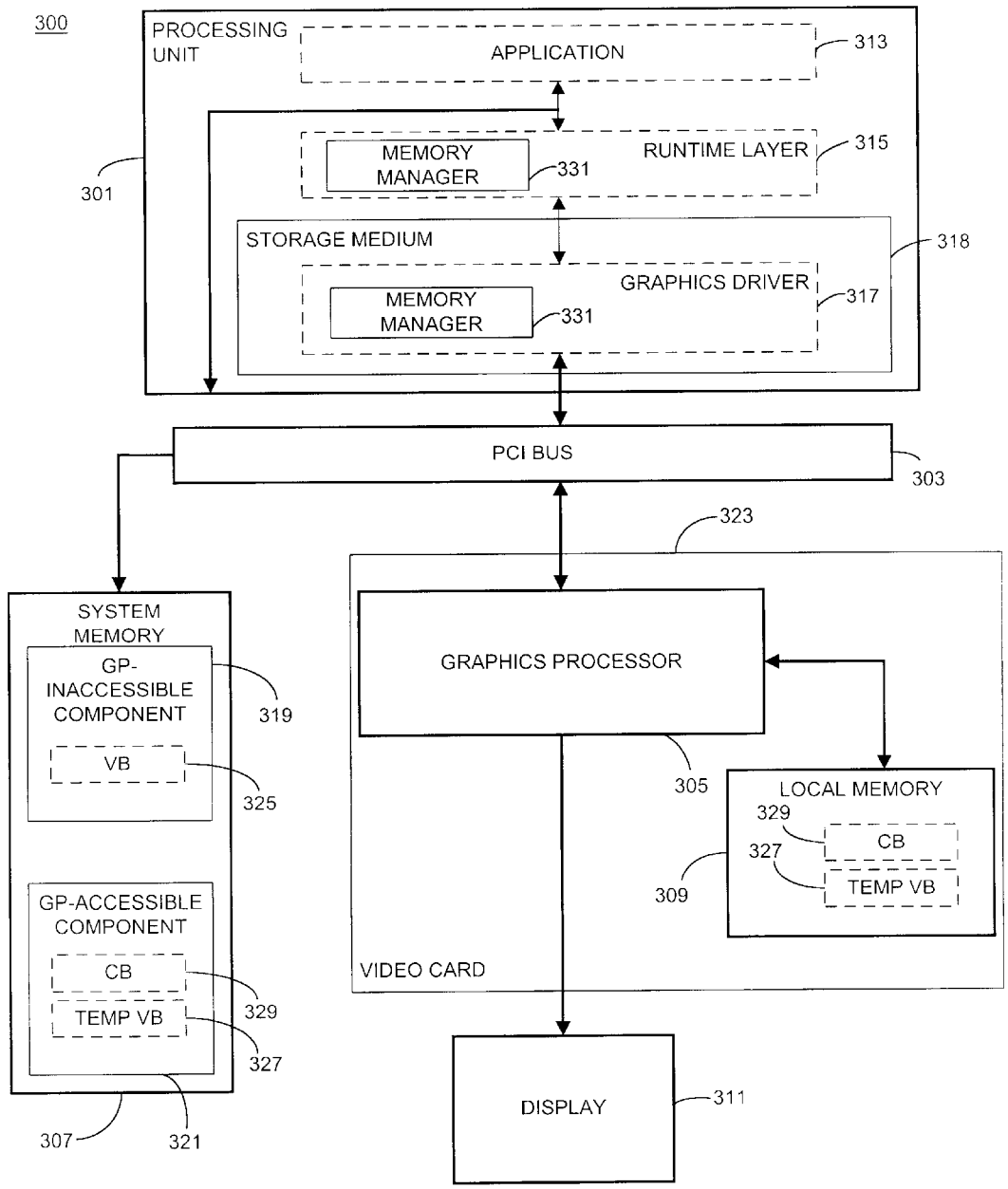
FIG. 3 is a block diagram of a video graphics system in accordance with the present invention.
Figure 4:
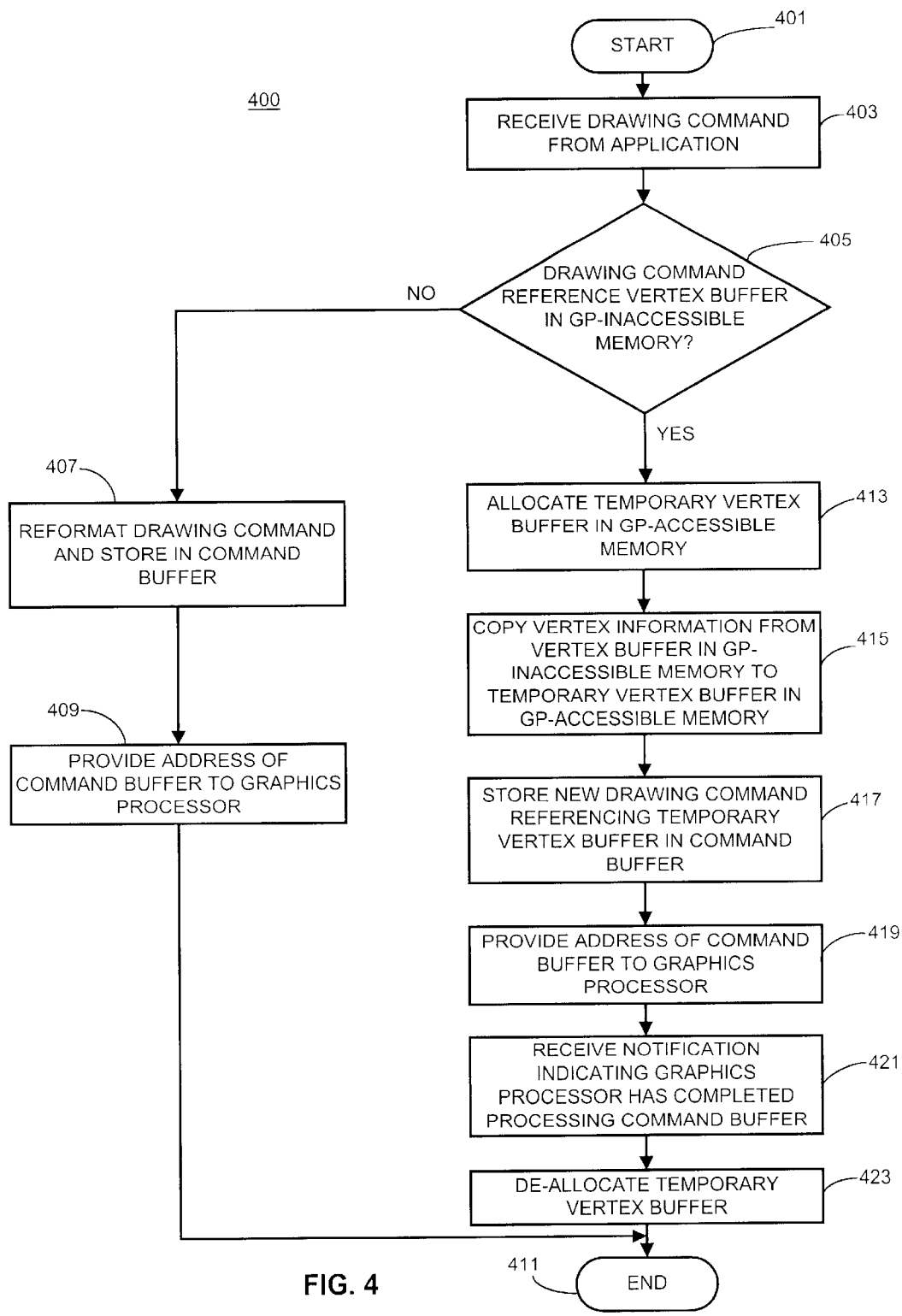
FIG. 4 is a logic flow diagram of steps executed by a graphics driver to efficiently provide vertex information to a graphics processor in accordance with a preferred embodiment of the present invention.
Figure 5:
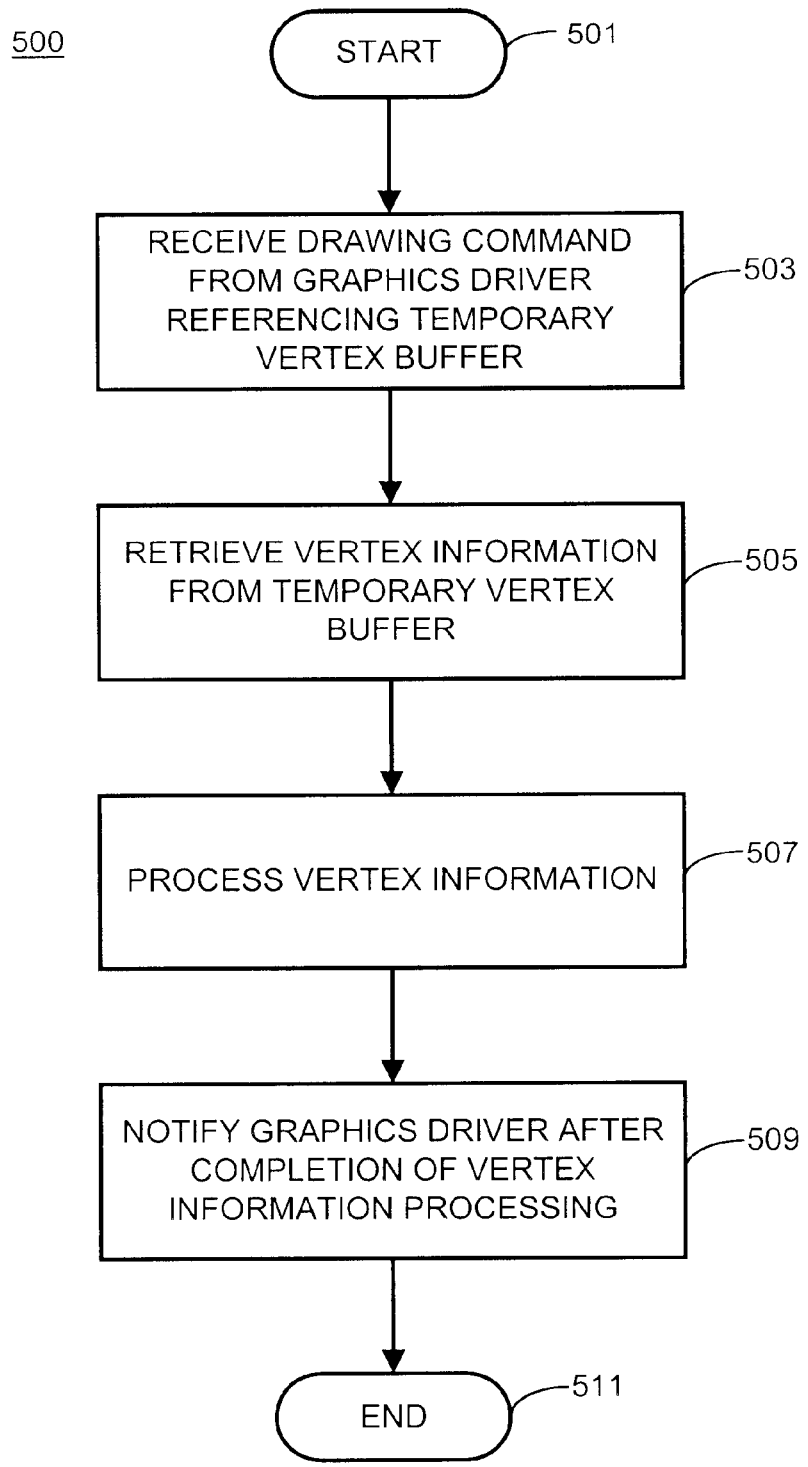
FIG. 5 is a logic flow diagram of steps executed by a graphics processor to efficiently obtain and process vertex information in accordance with a preferred embodiment of the present invention.

The present invention can be more fully understood with reference to FIGS. 3–5, in which like reference numerals designate like items. FIG. 3 illustrates a block diagram of a video graphics system 300 in accordance with the present invention. Similar to the video graphics system 100 of FIG. 1, the video graphics system 300 of FIG. 3 includes a processing unit 301, a PCI bus 303, a graphics processor 305, system memory 307, local graphics memory 309, and a display 311. The processing unit 301 may be a central processing unit (CPU) or any single or multiple microprocessor-based processing device, such as a handheld Internet appliance, a laptop computer, a palmtop computer, a personal computer, a workstation, a personal digital assistant (PDA), a set top box, a wireless communication device (e.g., a two-way radio, a radiotelephone, a wireless data device, a pager, or any wireless device combining functionality of any of the foregoing devices), or any other suitable computing device or devices that execute a software application 313, an operating system runtime software layer 315, and a graphics driver software component 317. In accordance with the present invention, the application 313 may be any software application which requests objects to be displayed on the display 311 and, during operation, stores vertex information (e.g., vertex position and color parameters) in a memory location 319 of the system memory 307 that is inaccessible to the graphics processor 305. For example, the application 313 might be a word processing application, a video game, a computer game, a spreadsheet application, or any other application that requires two-dimensional or three-dimensional objects to be displayed on a display device 311. The application 313 initiates all drawing commands and provides all information necessary for the other graphics applications and processing components to display objects on the display device 311.

The runtime software layer 315 may be any conventional runtime application that provides an API and/or a DDI to other applications, such as the graphics driver 317, which must communicate with the drawing-initiating application 313. One such runtime layer 315 is the "DIRECTX7" runtime software application that is commercially available from Microsoft Corporation of Redmond, Washington.

The graphics driver 317 is preferably a software application of operating instructions that is stored on a computer readable storage medium 318, such as a compact disc read only memory (CD-ROM), a floppy disk, a digital versatile disk (DVD) or a hard disk, and is sold as a unit with the video card 323. Alternatively, the graphics driver 317 may be a software application stored on a remote hard disk and downloaded into a hard disk component (not shown) of system memory 307 over a wide area network, such as the Internet. Still further, the graphics driver 317 may be any device or combination of devices, whether in hardware, software, or firmware, that allow multiple applications 313 to simultaneously store vertex information in memory 307, 309 and issue drawing commands to a graphics processor 305. Regardless of the type of permanent storage medium, the processing unit 301 preferably loads the software-implemented graphics driver 317 into a temporary storage medium, such as random access memory (RAM), during execution of the drawing-initiating application 313.

The graphics processor 305 is typically located on a video card 323 together with local memory 309 which is accessed and used regularly by the graphics processor 305. The graphics processor 305 is preferably embodied in an application specific integrated circuit (ASIC) and may include a single processing entity or multiple processing entities. Such a processing entity may be a microprocessor, a microcontroller, a digital signal processor (DSP), a state machine, logic circuitry, or any other device that processes information based on operational or programming instructions. One of ordinary skill in the art will recognize that when the graphics processor 305 has one or more of its functions performed by a state machine or logic circuitry, the memory containing the corresponding operational instructions may be embedded within the state machine or logic circuitry.

The PCI bus 303 is well known and typically includes appropriate hardware to couple the processing unit 301 to the system memory 307 and the graphics processor 305, and to couple the graphics processor 305 to the system memory 307. For example, depending on the system configuration, the PCI bus 303 may include a memory and bus controller integrated circuit (IC) and an accelerated graphics port (AGP) bus, which are commercially available from Intel Corporation of Santa Clara, Calif. and Via Technologies, Inc. of Fremont, Calif., to facilitate direct memory access (DMA) transfers of data stored in the system memory 307 to the graphics processor 305. Alternatively, one or more of the graphics processor 305, the processing unit 301 and the PCI bus memory and bus controller may be combined into a single IC. In such an alternative embodiment, an internal bus would be included on the IC to couple the graphics processor 305 to the PCI bus memory and bus controller.

The system memory 307 preferably includes at least two memory components 319, 321, at least one of which is a cacheable and swappable RAM component 319 that is not accessible by the graphics processor 305 and at least another of which is accessible by the graphics processor 305. The graphics processor-accessible memory component 321 of the system memory 307 is preferably a conventional accelerated graphics port (AGP) memory component. The system memory 307 may also include various other forms of memory, such as read only memory (ROM), floppy disks, CD-ROMs, a hard disk drive, a DVD or any other medium for storing digital information. With respect to the present invention, the system memory 307 is used to store vertex information (e.g., in vertex buffers 325) and may be used to store drawing commands (e.g., in command buffers 329). The system memory 307 is also preferably used to store programming and/or operational instructions that, when executed by the processing unit 301, enable the processing unit 301 to perform the functions of the graphics driver 317, which functions are described in detail below with respect to FIG. 4. As depicted in FIG. 3, the system memory 307 is located external to the video card 323 containing the graphics processor 305.

The video card local memory 309 preferably includes RAM, but may also include ROM or any other medium for storing digital information. With respect to the present invention, the video card local memory 309 is used to store vertex information (e.g., in a temporary vertex buffer 327 allocated by the graphics processor 305 as described in detail below) and drawing commands (e.g., in command buffers 329). The video card local memory 309 is also preferably used to store programming and/or operational instructions that, when executed by the graphics processor 305, enable the graphics processor 305 to perform at least some of the functions described in detail below with respect to FIG. 5.

The display device 311 may be any conventional cathode ray tube (CRT) display, liquid crystal display (LCD), or other display. Although not shown for purposes of clarity, other components, such as a video frame buffer, a video signal generator, and other known 3D pipeline components, are preferably incorporated between the graphics processor 305 and the display device 311 to properly display primitives rendered by the graphics processor 305.

Operation of the video graphics system 300 in accordance with a preferred embodiment can be more fully understood with reference to FIGS. 4 and 5. Referring first to FIG. 4, FIG. 4 is a logic flow diagram 400 of steps executed by the graphics driver 317 to efficiently provide vertex information to the graphics processor 305 in accordance with a preferred embodiment of the present invention. The logic flow begins (401) when the graphics driver 317 receives (403) a primitive rendering or drawing command from the application 313 via the runtime layer 315. The drawing command preferably includes indices corresponding to respective vertices of one or more graphics primitives to be rendered, an identification of a memory component 309, 319, 321 that includes a vertex buffer 325 containing vertex information for the indexed vertices, an address of the vertex buffer 325 in the memory component 309, 319, 321, and a quantity of vertices having vertex information stored in the vertex buffer 325. That is, the drawing command is preferably an indexed primitive list command, an indexed primitive strip command, or some other indexed format command.

Upon receiving the drawing command from the application 313, the graphics driver 317 determines (405) whether the vertex buffer 325 referenced in the drawing command is located in a graphics processor (GP)-inaccessible memory component, such as system memory component 319. Such a determination may be made by evaluating a flag supplied by the runtime layer 315 and accompanying the address of the vertex buffer 325 in the drawing command, wherein the flag indicates the location of the vertex buffer 325 as being graphics processor-accessible or graphics processor-inaccessible, or by comparing the address range of the vertex buffer 325 to a stored range of graphics processor-accessible memory addresses.

In the event that the vertex buffer 325 is located in a graphics processor-accessible memory component, such as system memory component 321 or video card local memory 309, the graphics driver 317 reformats (407) the drawing command in accordance with known techniques and stores (407) the drawing command in a command buffer 329 (e.g., in system memory component 321 or in video card local memory 309). The graphics driver 317 then provides (409) the address (and memory component identification, if necessary) of the command buffer 329 to the graphics processor 305, and the logic flow ends (413). Thus, if the vertex buffer 325 is located in a graphics processor-accessible memory component 321, 309, the graphics driver 317 simply processes the drawing command in accordance with prior art techniques.

On the other hand, in the event that the vertex buffer 325 is located in a graphics processor-inaccessible memory component, such as system memory component 319, the graphics driver 317 allocates (413) a temporary vertex buffer 327 in a graphics processor-accessible memory component, such as system memory component 321 or video card local memory 309, and copies (415) the vertex information from the original vertex buffer 325 into the temporary vertex buffer 327. Such allocation is preferably performed by a memory manager 331 forming part of either the graphics driver 317 or the runtime layer 315. When the memory manger 331 is part of the graphics driver 317, the temporary vertex buffer allocation is performed directly by the graphics driver 317. When the memory manager 331 is part of the runtime layer 315, the graphics driver 317 requests allocation of the temporary vertex buffer 327 from the runtime layer 315 and, therefore, performs the temporary vertex buffer allocation indirectly.

Having created the temporary vertex buffer 327, the graphics driver 317 creates a new drawing command (e.g., a new indexed primitive strip or indexed primitive list command) that references the temporary vertex buffer 327 and provides the new drawing command to the graphics processor 305. In a preferred embodiment, the graphics driver 317 provides the new command to the graphics processor 305 by storing (417) the new command in a command buffer 329 that contains one or more other drawing commands and providing (419) an address of the command buffer to the graphics processor 305 via the PCI bus 303. Alternatively, the graphics driver 317 may communicate the new command directly to the graphics processor 305 via the PCI bus 303 in the event that command buffers 329 are not used.

Some time after providing the new command to the graphics processor 305, the graphics driver 317 preferably receives (421) notification from the graphics processor 305 indicating that the graphics processor 305 has completed processing the new command or, more preferably, has completed processing the command buffer 329 containing the new command. Such notification is preferably in the form of a command buffer status indication stored in a graphics processor-accessible memory component 309, 321. The notification may be a single bit (e.g., one for processed and zero for pending) or may be multiple bits (e.g., if additional status information is desired). Alternatively, the graphics driver 317 may receive the notification directly from the graphics processor 305 via the PCI bus 303.

After the graphics driver 317 receives notification that the new command or the command buffer containing the new command has been processed by the graphics processor 305, the graphics driver 317 de-allocates (423) the temporary vertex buffer 327, and the logic flow ends (411). Such de-allocation is performed either directly or indirectly by the graphics driver 317 depending on the location of the memory manager 331. For example, if the memory manager 331 forms part of the graphics driver 317, then the temporary vertex buffer de-allocation is performed directly by the graphics driver 317. On the other hand, if the memory manager 331 forms part of the runtime layer 315, then the graphics driver 317 requests the memory manager 331 to de-allocate the temporary vertex buffer 327, thereby performing the temporary vertex buffer deallocation indirectly. As discussed above, the graphics driver 317 is preferably implemented as a software algorithm stored on a computer-readable storage medium 318, such as any form of RAM, any form of read only memory (ROM) (including, without limitation, programmable ROM (PROM) and CD-ROM), any form of magnetic storage media (including, without limitation, a floppy disk or a magnetic tape), a digital versatile disk (DVD), any combination of the foregoing types of media, such as a hard drive, or any other device that stores digital information.

FIG. 5 is a logic flow diagram 500 of steps executed by the graphics processor 305 to efficiently obtain and process vertex information in accordance with a preferred embodiment of the present invention. The steps of the logic flow diagram 500 are preferably implemented in a state machine or microcomputer code that is executed by the graphics processor 305. The logic flow begins (501) when the graphics processor 305 receives (503) a drawing command from the graphics driver 317 either directly or indirectly as part of a command buffer 329 retrieved from memory 307, 309. The drawing command includes an address of a temporary vertex buffer 327 allocated by the graphics driver 317 in response to the drawing-initiating application's storage of vertex information in a graphics processor-inaccessible component 319 of system memory 307.

Upon initiating execution of the drawing command, the graphics processor 305 retrieves (505) or reads the vertex information for each vertex from the temporary vertex buffer 327 based on the address of the temporary vertex buffer 327 in graphics processor-accessible memory 309, 321 and the associated index contained in the drawing command in accordance with known data retrieval techniques. After the vertex information for each vertex has been read or after vertex information for a predetermined quantity of vertices has been read from the temporary vertex buffer 327, the graphics processor 305 processes (507) the vertex information. Such processing is well known and includes operations such as transform and lighting processing, clipping processing, and rasterizing or rendering of the graphics primitives defined by the vertices to which the vertex information relates. After the graphics processor 305 has completed processing the vertex information or, in a preferred embodiment, after the graphics processor 305 has completed executing all the commands contained in the command buffer 329 containing the drawing command, the graphics processor 305 notifies (509) the graphics driver that vertex information processing has been completed, and the logic flow ends (511). Such notification may be provided directly to the graphics driver 317 via the PCI bus 303 or may be provided by changing one or more status bits in a status register associated with the command buffer 329. By notifying the graphics driver 317 of processing completion, the graphics processor 305 facilitates de-allocation of the temporary vertex buffer 327 so that the memory area containing the temporary vertex buffer 327 may be used for other processing purposes.

The present invention encompasses a method and apparatus for efficiently processing vertex information in a video graphics system. With this invention, indexed drawing commands, such as indexed primitive list commands and indexed primitive strip commands, may be processed by the graphics driver 317 as indexed commands even though the drawing-initiating application 313 has stored the vertex information relating to the commands in a vertex buffer 325 that cannot be directly accessed by the graphics processor 305. In contrast to prior art systems in which the graphics drivers convert the indexed commands into non-indexed primitive list commands under such circumstances, the present invention maintains the indexed nature of the command and creates a temporary vertex buffer in an area of memory 307, 309 that is accessible by the graphics processor 305, thereby substantially reducing the amount of information that must be retrieved by the graphics processor 305 to process the command and increasing the overall speed and efficiency of the video graphics system 300.

For example, referring back to the processing required to render the object 200 of FIG. 2, when the vertex buffer 125 is located in a component 121 of system memory 107 that is inaccessible by the graphics processor 105, prior art techniques of converting an indexed command to a primitive list command require the graphics driver 105 to copy 960 bytes of vertex information (assuming 20 bytes of vertex information per vertex 218–232 and three vertices per triangle primitive 201–216 for a total of forty-eight vertices) from the vertex buffer 125 into the command buffer 127, and the graphics processor 105 to read the 960 bytes of information from the command buffer 127 to execute the command and process the vertex information. By contrast, the present invention, under similar circumstances, requires the graphics driver 305 to copy only 300 bytes of vertex information (20 bytes of vertex information for each of the fifteen vertices 218–232) from the vertex buffer 325 into the temporary vertex buffer 327, and the graphics processor 305 to read the 300 bytes of vertex information from the temporary vertex buffer 327 and the index information (e.g., 96 bytes for an indexed primitive list command or 40 bytes for an indexed primitive strip command) from the command buffer 127 to execute the command and process the vertex information. Thus, the present invention requires substantially less information to be communicated between video processing elements to accomplish drawing command execution, thereby improving processing speed and efficiency.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for a graphics driver to efficiently provide vertex information to a graphics processor in a video graphics system when the vertex information is stored by an application in a first memory component that is inaccessible to the graphics processor, the method comprising the steps of:

receiving a first command from the application, the first command requesting display of at least one graphics primitive and including a plurality of indices, each index of the plurality of indices corresponding to a respective vertex of a plurality of vertices for which associated vertex information is stored in the first memory component;

allocating a portion of a second memory component for storing the vertex information associated with the plurality of vertices to produce a vertex buffer, the second memory component being accessible by the graphics processor;

copying the vertex information associated with the plurality of vertices from the first memory component into the vertex buffer; and providing at least a second command to the graphics processor, the second command including the plurality of indices and an address of the vertex buffer in the second memory component.

2. The method of claim 1, further comprising the step of:
 de-allocating the vertex buffer after the vertex information in the vertex buffer has been processed by the graphics processor.

3. The method of claim 2, further comprising the step of:
 receiving a notification from the graphics processor, the notification indicating that the graphics processor has completed processing the vertex information in the vertex buffer.

4. The method of claim 1, wherein the vertex information includes position information and color information.

5. The method of claim 1, wherein the at least a second command comprises a plurality of commands stored in the second memory component and wherein the step of providing the at least a second command comprises the step of:
 providing an address within the second memory component at which the plurality of commands are stored.

6. The method of claim 1, wherein the graphics processor is located on a video card and wherein the second memory component comprises at least one of (a) a local memory that is operably coupled to the graphics processor and located on the video card, and (b) an accelerated graphics port (AGP) memory that is operably coupled to the graphics processor, but located external to the video card.

7. A method for a graphics processor of a video graphics system to efficiently obtain and process vertex information originally stored by an application in a first memory component that is inaccessible by the graphics processor, the method comprising the steps of:

receiving at least one command from a graphics driver, the at least one command including a plurality of indices and an address of a vertex buffer within a second memory component that is accessible by the graphics processor, each index of the plurality of indices corresponding to a respective vertex of a plurality of vertices, the vertex buffer being temporarily allocated by the graphics driver to store vertex information associated with the plurality of vertices which was originally stored in the first memory component by the host application;

retrieving the vertex information for each vertex of the plurality of vertices from the vertex buffer based at least on the address of the vertex buffer within the second memory component and the plurality of indices;

processing the vertex information for each vertex of the plurality of vertices; and notifying the graphics driver after completion of vertex information processing to facilitate de-allocation of the vertex buffer.

8. A storage medium comprising:

memory including operating instructions that, when executed, cause at least one processing device to perform at least the following functions in the event that vertex information is stored by an application in a first memory component that is inaccessible by a graphics processor of the video graphics system:

receive a first command from the application, the first command requesting display of at least one graphics primitive and including a plurality of indices, each index of the plurality of indices corresponding to a respective vertex of a plurality of vertices for which associated vertex information is stored in the first memory component;

allocate a portion of a second memory component for storing the vertex information associated with the plurality of vertices to produce a vertex buffer, the second memory component being accessible by the graphics processor;

copy the vertex information associated with the plurality of vertices from the first memory component into the vertex buffer; and provide at least a second command to the graphics processor, the second command including the plurality of indices and an address of the vertex buffer in the second memory component.

9. The storage medium of claim 8, wherein the memory further includes operating instructions that, when executed, cause the at least one processing device to:
 de-allocate the vertex buffer after the vertex information in the vertex buffer has been processed by the graphics processor.

10. The storage medium of claim 9, wherein the memory further includes operating instructions that, when executed, cause the at least one processing device to:
 receive a notification from the graphics processor, the notification indicating that the graphics processor has completed processing the vertex information in the vertex buffer.

11. The storage medium of claim 8, wherein the storage medium comprises at least one of a random access memory, a read only memory, a floppy disk, a hard disk drive, a CD-ROM, and a digital versatile disk (DVD).

12. A video graphics system for displaying graphics primitives requested for display by an application, each graphics primitive being defined by at least one vertex, each vertex being characterized by respective vertex information, the video graphics system comprising:

a graphics processor configured to process vertex information at least identified in a first command;

a first memory component that is accessible by the graphics processor;

a second memory component that is inaccessible by the graphics processor, the second memory component containing vertex information associated with a plurality of vertices defining at least one graphics primitive; and a graphics driver operably coupled to the application, the graphics processor, the first memory component and the second memory component, the graphics driver configured to:

receive a second command from the application, the second command requesting display of the at least one graphics primitive and including a plurality of indices, each index of the plurality of indices corresponding to a respective vertex of the plurality of vertices for which associated vertex information is stored in the second memory component;

allocate a portion of the first memory component for storing the vertex information associated with the plurality of vertices to produce a vertex buffer;

copy the vertex information associated with the plurality of vertices from the second memory component into the vertex buffer; and provide at least the first command to the graphics processor, the first command including the plurality of indices and an address of the vertex buffer in the first memory component.

13. The video graphics system of claim 12, wherein the graphics processor is located on a video card and wherein the first memory component comprises at least one of (a) a local memory that is operably coupled to the graphics processor and located on the video card, and (b) an accelerated graphics port (AGP) memory that is operably coupled to the graphics processor, but located external to the video card.

14. The video graphics system of claim 12, wherein the first memory component and the second memory component are components of system memory accessible by the application.

15. The video graphics system of claim 12, wherein the graphics driver is further configured to:

de-allocate the vertex buffer after the vertex information in the vertex buffer has been processed by the graphics processor.

16. The video graphics system of claim 15, wherein the graphics driver is further configured to:

receive a notification from the graphics processor, the notification indicating that the graphics processor has completed processing the vertex information in the vertex buffer.

17. The video graphics system of claim 12, wherein the graphics processor is further configured to:

retrieve the vertex information from the vertex buffer based on the address of the vertex buffer and the plurality of indices; and notify the graphics driver upon completion of processing the vertex information to facilitate de-allocation of the vertex buffer.

18. The video graphics system of claim 12, wherein the first command comprises one of a plurality of commands stored in the first memory component and wherein to provide at least the first command to the graphics processor, the graphics driver is configured to provide the graphics processor an address within the first memory component at which the plurality of commands are stored.

* * * * *